INVENTORS.
ROGER TEMPLETON LEWIS MOWLL
HUGH MICHAEL CHAPLIN SMITH
By MORGAN, FINNEGAN, DURHAM & PINE
ATTORNEYS 3,342,726
PURGING AND DESORBING A MOLECULAR SIEVE WITH PENTANE
Roger Templeton Lewis Mowll, Chertsey, Surrey, and Hugh Michael Chaplin Smith, Frimley, Surrey, England, assignors to The British Petroleum Company Limited, London, England, a corporation of England
Filed Apr. 22, 1965, Ser. No. 450,152
Claims priority, application Great Britain, May 19, 1964, 20,577/64
6 Claims. (Cl. 208—310)

ABSTRACT OF THE DISCLOSURE

Straight chain hydrocarbons are separated from petroleum fractions boiling in the range $C_9$ and above diluted with a suitable medium (for example pentane), by adsorption on a 5 A. molecular sieve bed in a first stage. The bed is purged in a second stage to remove surface held and interstitially held material, by treating the sieve with a stream of the same medium (pentane) passed through the sieve in a direction opposite to that in which the feed fraction was passed in the first stage. The straight chain hydrocarbons are then desorbed in a third stage by contacting the sieve with a stream of the same medium (pentane) passed through the sieve in the same direction as the stream in the second purge stage.

---

Figure 1:
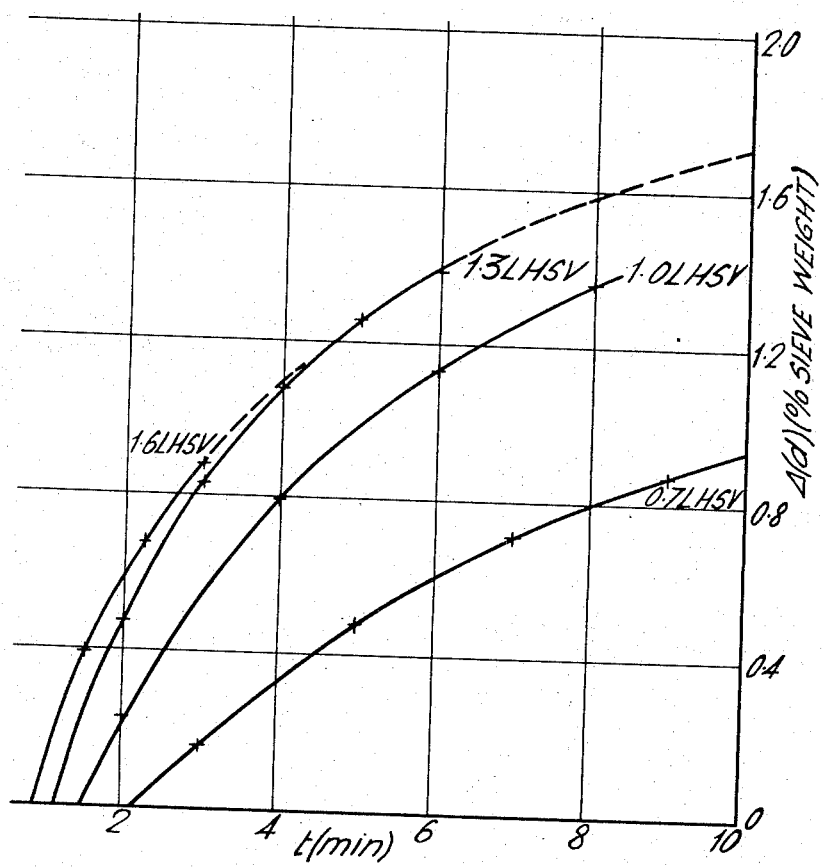

This invention relates to the separation of hydrocarbon mixtures and particularly to the separation of straight chain hydrocarbons from mixtures of the same with branched-chain and/or cyclic hydrocarbons using molecular sieves.

It is well known that certain natural and synthetic zeolites have the property of preferentially absorbing certain types of hydrocarbons. These zeolites, known as molecular sieves, have crystalline structures containing a large number of pores of uniform size. In different zeolites these pores may be from 4 A. to 15 A. in diameter, but in any one zeolite the pores will be of substantially uniform size.

It has previously been proposed to treat hydrocarbon mixtures with molecular sieves. It has been proposed to treat petroleum fractions ranging from gasoline to gas-oils and higher with molecular sieves having pore diameters ranging from 4 A. to 15 A. In order to separate straight-chain hydrocarbons from branched chain and/or cycle hydrocarbons a molecular sieve having pore diameters of 5 A. is suitable. Such a process may be used to recover a denormalised fraction, for example a gasoline of higher octane number due to the removal of low octane number normal paraffins. The absorbed straight-chain material may also be recovered if required.

According to the present invention, a continuous, cyclic, isothermal isobaric and wholly vapour phase process for the separation of straight-chain hydrocarbons from petroleum fractions boiling in the range $C_9$ and above comprises contacting the fraction, diluted with a suitable medium, with a 5 A. molecular sieve in a first stage to absorb straight-chain hydrocarbons, contacting the sieve in a second stage with a stream of the same medium passed through the sieve in a direction opposite to that in which the feed fraction was passed to remove material adsorbed on the surface of the sieve or held interstitially between sieve particles and recycling the removed material to the feedstock to the absorption stage, and contacting the sieve in a third stage with a stream of the same medium passed through the sieve in the same direction as the stream in the second (purge) stage to desorb the absorbed straight-chain hydrocarbons.

By operating according to the present invention it is possible to obtain straight-chain hydrocarbon products with purities of greater than 95% with high extraction efficiencies of up to 97% and with a simplified plant compared to the known processes using different materials as purging and desorbing media. By using a single material as feed diluent, purging medium and desorbing medium, a considerable saving can be achieved compared with plants employing two or more materials for these duties, which of course entails separate plant facilities for storing, separating and handling each material. A variety of materials may be used, particularly hydrocarbons and mixtures of hydrocarbons of boiling range differing from the feedstock, but n-pentane has been found to be a particularly suitable material capable of acting in all three capacities.

A particular feature of the present invention is the direction in which the purging medium is passed through the sieve bed. N-pentane is a very efficient desorbing medium and its use as a purging medium does result in a certain amount of desorption of material from within the sieve pores. Clearly, the longer the purge stage the greater is the amount of material desorbed during that stage. It is therefore necessary to limit the period of the pentane purge to avoid excessive loss of product. It has been found that by passing the n-pentane through the bed in the direction opposite to that of the feedstock in the preceding absorption stage, efficient purging of surface adsorbed material and interstitially held material can be effected in a very short time without at the same time causing excessive loss of straight-chain material from within the sieve pores. The reason for this is believed to be that exchange between the purging medium (n-pentane) and surface-adsorbed material proceeds more rapidly than does the displacement of material absorbed within the sieve pores. The purging medium should be passed at as high a rate, and for as short a period, as is conveniently possible in order that non-normal hydrocarbons should be removed with minimum loss of n-paraffins from the sieve pores. Preferably the purge stage is limited to not more than 2 minutes.

Desorption is effected by continuing the flow of n-pentane in the same direction as in the purge stage, i.e. the stages are distinguished by a switching of the effluent at the beginning of the desorption period to a product recovery system. As the absorption of a mixture of hydrocarbons is chromatographic in type, i.e. the heaviest hydrocarbons are absorbed at the feed inlet of the bed, in the process of the present invention in which the desorption is conducted in a direction opposite to that of absorption, during the desorption stage the heaviest straight-chain hydrocarbons have the least distance to travel out of the sieve bed which is advantageous. Moreover, desorption is aided by the passage of desorbed light straight-chain hydrocarbons back over the inlet end of the bed.

The effluent from the purge stage is recycled to the absorption stage feedstock to ensure good extraction efficiencies in the process. As stated above some desorption of straight-chain hydrocarbons during the purge stage is inevitable. By recycling the effluent from the purge stage complete loss of these straight-chain hydrocarbons is prevented.

The feedstock to the absorption stage is diluted to assist vaporisation thereof and thus results in more efficient absorption.

Suitable process conditions for absorptive separation processes using molecular sieves are well known and include a temperature within the range 300–450° C., preferably 350–400° C. and a pressure within the range 50–200 p.s.i.g., preferably 50–100 p.s.i.g.

Figure 2:
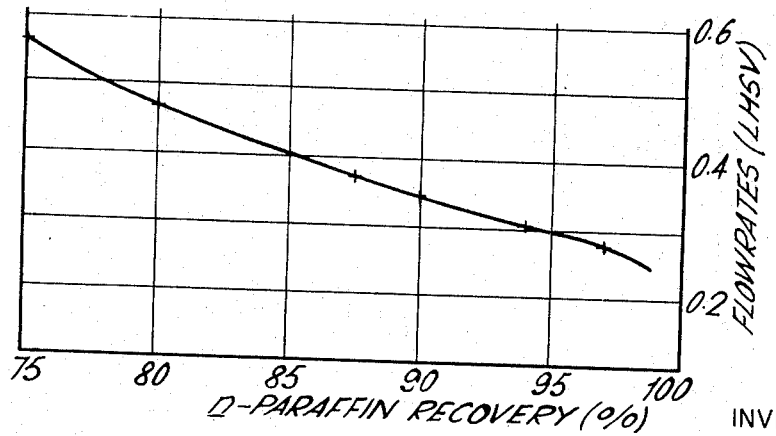

The feed rate to the absorption stage should be adjusted so that the most economic n-paraffin extraction efficiency can be achieved. This extraction efficiency normally lies between 75 and 97% of the n-paraffin input. The most suitable feed rate can be determined for a given set of process conditions by experiment. As an example the effect of feed rate on extraction efficiency at 380° C. and 50 p.s.i.g. is shown in the accompanying FIGURE 2.

The pentane flow rate required to dilute the feedstock to the absorption stage at the preferred conditions, may be wholly met by recycling the purge stage effluent. In the purge and desorption stages the pentane flow rate is preferably in the range 0.75–1.6 LHSV. However, it has been found that there is little advantage to be gained in passing pentane to the desorption stage at a rate above 1.3 LHSV, probably because the rate of desorption is then no longer influenced by equilibrium considerations. This is illustrated in the accompanying FIGURE 1 which shows cumulative elution curves at various pentane flow rates at 380° C. and 50 p.s.i.g. There may, therefore, be an advantage to be gained by employing a pentane flow rate in the purge stage which is higher than that during the desorption stage since purging at high pentane rate for a short period is more efficient and desorbs less material from within the sieve pores than purging at lower pentane rates for longer periods.

The number of sieve beds employed in the cyclic process of the present invention may be as few as two or even one, although it is preferred to operate with a higher number, for example six or seven. The actual number of beds used will depend upon the ratio of the periods of the three stages. Preferably the periods of the various stages are a whole number multiple of the period of the shortest stage, which in the process of the present invention is the purge stage. Thus, for example, if the ratio of the periods of the absorption:desorption stages is 3:1:2, say 4½ minutes, 1½ minutes and 3 minutes respectively, the total number of beds will be 6, i.e. 3 absorbing, 1 purging and 2 desorbing. Similarly for a ratio of 4:1:2 the total number of beds will be 7. This, of course, does not take into account the provision, if required, of a further, swing, reactor for periodic regeneration to remove carbonaceous deposits, for example by the customary method of burning under controlled conditions with an oxygen containing gas.

The process is illustrated with reference to the following example:

*Example*

A petroleum distillate fraction boiling in the $C_{10}$–$C_{13}$ range and containing 21.9% by weight of n-paraffins was treated in a cyclic process according to the present invention in a single bed containing 6200 gms. of 5 A. molecular sieve.

The periods of absorption, purge, and desorption were respectively 5 mins. 1 min. 10 secs., and 3 mins. 50 secs. A temperature of 380° C. and a pressure of 50 p.s.i.g. were employed throughout.

The feedstock was passed to the absorption stage at the rate of 1730 gms./hr. together with 80 gms./hr. of diluent pentane, and 1122 gms./hr. of recycled purge stage effluent consisting of 357 gms. non-normal hydrocarbons, 265 gms. n-paraffins other than n-pentane, and 500 gms. n-pentane.

The bed was purged and desorbed with 3335 gm./hr. of n-pentane. The n-paraffin product was recovered from the desorption stage, after separation from n-pentane desorbent, at the rate of 364 gms./hr. in a purity of 97.3% by weight representing an extraction efficiency of 93.4%.

We claim:
1. A continuous, cyclic, isothermal, isobaric and wholly vapor phase process for the separation of straight-chain hydrocarbons from petroleum fractions boiling in the range $C_9$ and above, comprising contacting the fraction, diluted with pentane, with a 5 A. molecular sieve in a first stage to absorb straight-chain hydrocarbons; contacting the sieve in a second stage with a stream of pentane passed through the sieve in a direction opposite to that in which the feed fraction was passed to remove material adsorbed on the surface of the sieve and material held interstitially between sieve particles and recycling the removed material to the feedstock to the absorption stage; and contacting the sieve in a third stage with a stream of pentane passed through the sieve in the same direction as the stream in the second (purge) stage to desorb the absorbed straight chain hydrocarbons.

2. A process as claimed in claim 1 wherein the temperature employed is within the range 300–450° C., preferably 350–400° C., and the pressure employed is within the range 50–200 p.s.i.g., preferably 5–100 p.s.i.g.

3. A process as claimed in claim 1 wherein the feed rate to the absorption stage is adjusted to achieve an extraction efficiency between 75 and 97% of the n-paraffin input.

4. A process as claimed in claim 1 wherein the n-pentane flow rate to the purge and desorption stages is within the range 0.75–1.6 LHSV.

5. A process as claimed in claim 1 wherein the purge stage period is limited to a maximum duration of 2 minutes.

6. A process as claimed in claim 1 wherein the periods of the various stages are a whole number multiple of the purge stage period.

References Cited

UNITED STATES PATENTS

| | | | |
|---|---|---|---|
| 3,201,490 | 8/1965 | Lacey et al. | 260—676 |
| 3,291,725 | 12/1966 | Brodbeck | 208—310 |
| 3,309,415 | 3/1967 | Young et al. | 260—676 |

DELBERT E. GANTZ, *Primary Examiner.*

HERBERT LEVINE, *Assistant Examiner.*